US012794504B2

(12) United States Patent
Tanimura

(10) Patent No.: US 12,794,504 B2
(45) Date of Patent: Nov. 10, 2026

(54) SUBSTRATE CONNECTION STRUCTURE FOR IN-VEHICLE COMMUNICATION DEVICE

(71) Applicant: DENSO CORPORATION, Kariya-city (JP)

(72) Inventor: Yasunari Tanimura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 308 days.

(21) Appl. No.: 18/602,950

(22) Filed: Mar. 12, 2024

(65) Prior Publication Data

US 2024/0223234 A1 Jul. 4, 2024

Related U.S. Application Data

(63) Continuation of application No. PCT/JP2022/033724, filed on Sep. 8, 2022.

(30) Foreign Application Priority Data

Oct. 7, 2021 (JP) ................................ 2021-165488

(51) Int. Cl.
*H04B 1/3822* (2015.01)
*H01R 24/50* (2011.01)
*H01R 103/00* (2006.01)

(52) U.S. Cl.
CPC .......... *H04B 1/3822* (2013.01); *H01R 24/50* (2013.01); *H01R 2103/00* (2013.01)

(58) Field of Classification Search
CPC ........ H04B 1/3822; H04B 1/08; H01R 24/50; H01R 2103/00
See application file for complete search history.

(56) References Cited

U.S. PATENT DOCUMENTS

| | | | | |
|---|---|---|---|---|
| 10,728,723 B2 * | 7/2020 | Uchiyama | ............... | H04W 4/40 |
| 2022/0232701 A1 * | 7/2022 | Chou | ..................... | H05K 1/111 |
| 2023/0232589 A1 * | 7/2023 | Sugahara | ........... | H05K 7/20154 361/697 |

FOREIGN PATENT DOCUMENTS

| | | | | | |
|---|---|---|---|---|---|
| JP | 3107906 | U | | 4/2005 | |
| JP | 2008306322 | A | | 12/2008 | |
| JP | 2013004361 | A | * | 1/2013 | |
| JP | 6210614 | B2 | | 10/2017 | |
| JP | 2019086300 | A | * | 6/2019 | |
| JP | 2020205489 | A | | 12/2020 | |
| WO | WO-2024033704 | A1 | * | 2/2024 | ............ H05K 3/361 |

* cited by examiner

*Primary Examiner* — Curtis A Kuntz
(74) *Attorney, Agent, or Firm* — Harness, Dickey & Pierce, P.L.C.

(57) ABSTRACT

A substrate connection structure for a vehicle-mounted communication device includes a network access device having at least a wireless communication function a main substrate on which the network access device is mounted, an antenna be used for the wireless communication performed by the network access device, and an RF connector, which is mounted on the main substrate, connected to the antenna. The main substrate is connected to a sub substrate having an optional communication function via a coaxial connector in a vertically overlapping manner. The antenna is used for the optional communication function performed by the sub substrate. The antenna is connected to the optional communication function via the coaxial connector when the main substrate is connected to the sub substrate.

1 Claim, 7 Drawing Sheets

SUBSTRATE CONNECTION STRUCTURE FOR IN-VEHICLE COMMUNICATION DEVICE

CROSS REFERENCE TO RELATED APPLICATIONS

The present application is a continuation application of International Patent Application No. PCT/JP2022/033724 filed on Sep. 8, 2022, which designated the U.S. and claims the benefit of priority from Japanese Patent Application No. 2021-165488 filed on Oct. 7, 2021. The entire disclosures of all of the above applications are incorporated herein by reference.

TECHNICAL FIELD

The present disclosure relates to a substrate connection structure for a communication device mounted on a vehicle.

BACKGROUND

Communication devices are becoming increasingly multi-functional, and necessary communication functions are selected by dividing communication device substrates and combining the substrates.

SUMMARY

According to at least one embodiment, a substrate connection structure for a vehicle-mounted communication device includes a network access device having at least a wireless communication function a main substrate on which the network access device is mounted, an antenna be used for the wireless communication performed by the network access device, and an RF connector, which is mounted on the main substrate, connected to the antenna. The main substrate is connected to a sub substrate having an optional communication function via a coaxial connector in a vertically overlapping manner. The antenna is used for the optional communication function performed by the sub substrate. The antenna is connected to the optional communication function via the coaxial connector when the main substrate is connected to the sub substrate.

BRIEF DESCRIPTION OF DRAWINGS

The details of one or more embodiments are set forth in the accompanying drawings and the description below. Other features and advantages will be apparent from the description and drawings, and from the claims.

The above and other features and advantages of the present disclosure will become more apparent from the following detailed description made with reference to the accompanying drawings.

DETAILED DESCRIPTION

Figure 1:
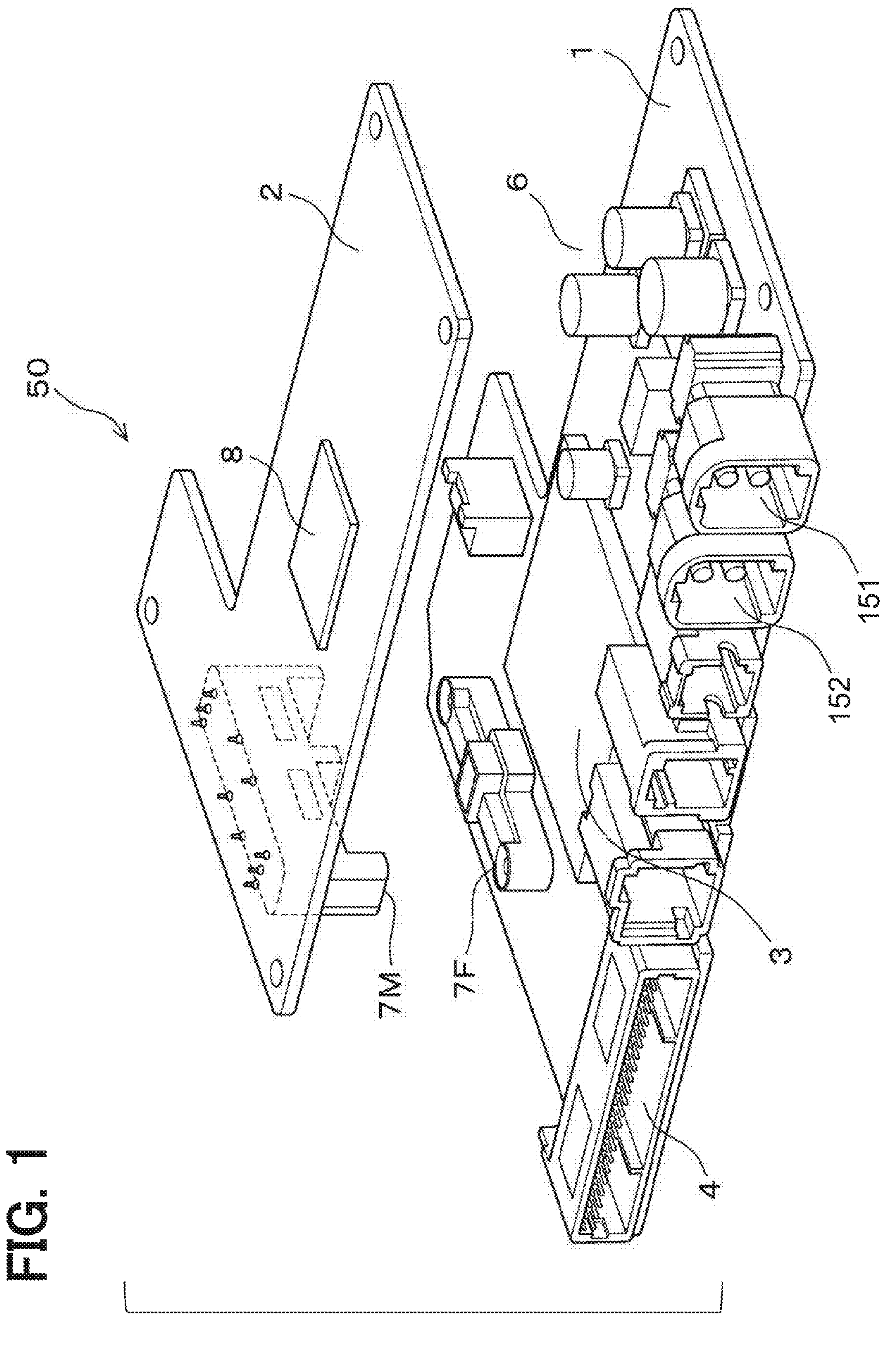
FIG. 1 is an exploded perspective view partially showing a main substrate and a sub substrate that constitute a smart communication unit (i.e., SCU) in the first embodiment.

To begin with, examples of relevant techniques will be described.

In general, as vehicles become more multi-functional, variety of types of wireless communications carried out in vehicles is also increasing, and the number of communication devices installed therein also tends to increase accordingly. Therefore, in order to reduce the mounting space and weight of these devices, integration of communication devices such as telephones, Wi-Fi (registered trademark), and GNSS (i.e., Global Navigation Satellite System) is being promoted. Furthermore, since wireless communication system specifications differ from country to country, patterns of combining communication functions are increasing.

For example, to accommodate such an increase in the number of communication function combination patterns, a communication device in a first comparative example is modularized and mounted on a sub substrate to accommodate differences in broadcast frequencies and specifications of each country for radio tuners installed in vehicles, and the sub substrate connected to a main substrate can be replaced. Furthermore, a communication device of a second comparative example is designed to be smaller and thinner in a configuration in which a sub substrate on which a wireless module is similarly mounted is mounted on a main device.

However, in the communication device of the first comparative example, since two antenna connectors for the tuner are mounted on the sub substrate, space is required to align the connectors on the sub substrate, and an overall size of the communication device becomes large.

In addition, the communication device of the second comparative example has a thinner profile by mounting a short coaxial connector on the sub substrate, but it has a configuration in which the external antenna is connected to the coaxial connector from a top or bottom of the product. Therefore, the benefits of thinning cannot be fully obtained.

According to one aspect of the present disclosure, a substrate connection structure for a vehicle-mounted communication device includes a network access device having at least a wireless communication function a main substrate on which the network access device is mounted, an antenna be used for the wireless communication performed by the network access device, and an RF connector, which is mounted on the main substrate, connected to the antenna. The main substrate is connected to a sub substrate having an optional communication function via a coaxial connector in a vertically overlapping manner. The antenna is used for the optional communication function performed by the sub substrate. The antenna is connected to the optional communication function via the coaxial connector when the main substrate is connected to the sub substrate.

With this configuration, there is no need to provide a connector for connecting an optional antenna for communication on the sub substrate, so the sub substrate can be configured to be compact. The main substrate and the sub substrate overlap vertically when the sub substrate is connected to the main substrate. Therefore, a thickness of a structure connected to the main substrate and the sub substrate can be reduced.

First Embodiment

As shown in FIG. 1, the substrate connection structure of a first embodiment is a structure in which a main substrate 1 and a sub substrate 2 are electrically connected to each other. An SCU (i.e., Smart Communication Unit) 50, which is an in-vehicle integrated communication device, includes the main substrate 1 and the sub substrate 2. The SCU 50 is used, for example, in a vehicle to communicate with a center device or the like.

The main substrate 1 is mounted a NAD (i.e., Network Access Device) 3, a main connector 4 for connecting various communication interfaces (I/F) with an outside, and RF connectors 151, 152 to which antennas are connected, and circuit components 6. The NAD 3 is a functional unit that performs general cellular wireless communication.

Further, the main substrate 1 is equipped with a first coaxial connector 7F for transmitting high frequency signals between it and the sub substrate 2. The coaxial connector 7F is for example a coaxial connector for board-to-board connection. The RF connectors 151, 152 are connected to the first coaxial connector 7F by a wiring pattern.

On the other hand, on a surface of the sub substrate 2, a wireless module 8, which is a functional unit that performs V2X (i.e., Vehicle to X) communication, is mounted. There are two methods of the V2X, DSRC and C-V2X, and a communication frequency is, for example, from several 100 MHz to several GHz. Further, on a back surface of the sub substrate 2, a second coaxial connector 7M connected to the first coaxial connector 7F of the main substrate 1 is mounted.

Figure 2:
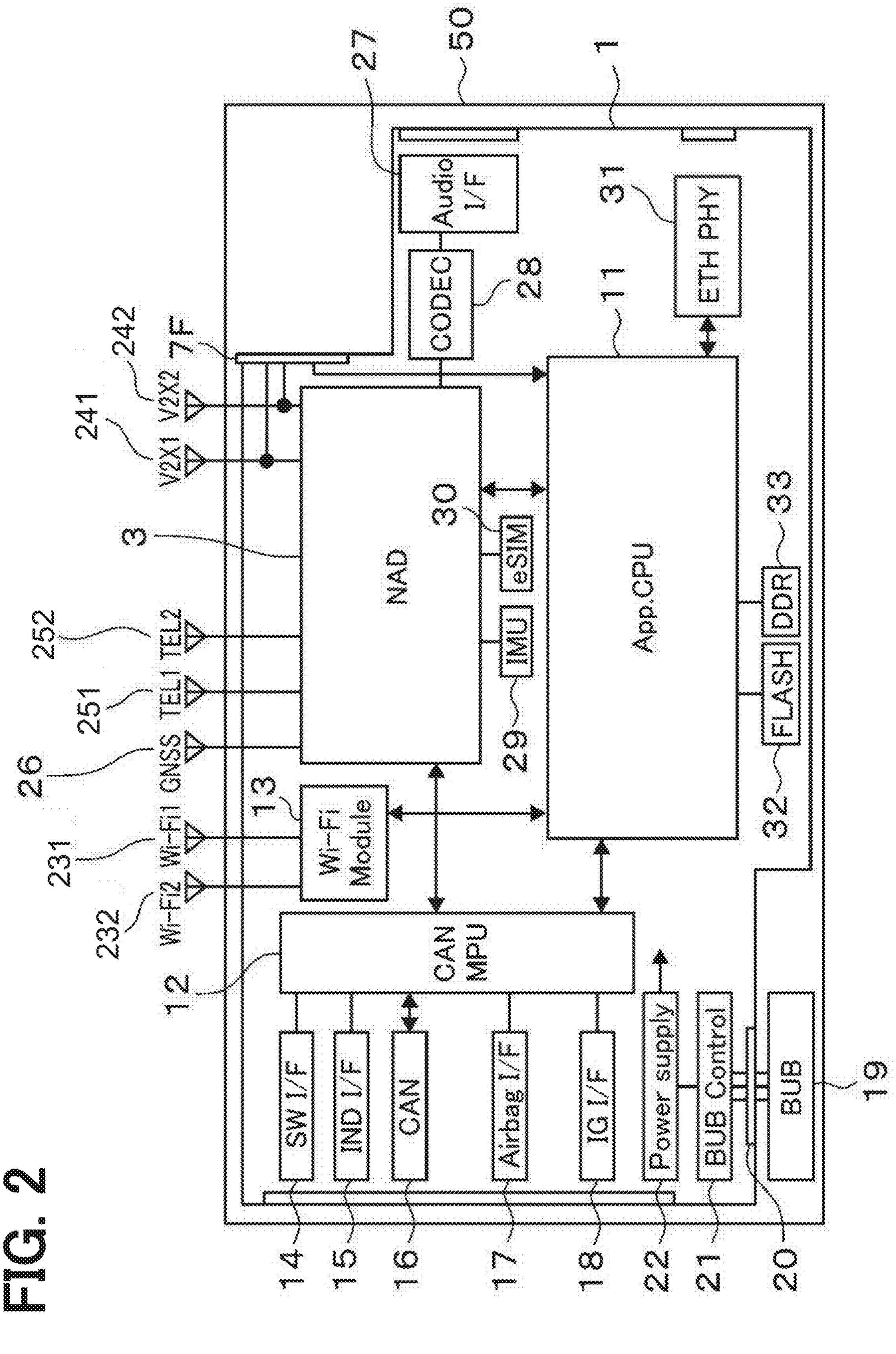
FIG. 2 is a functional block diagram illustrating the SCU when only the main substrate is used.

In addition, as shown in FIG. 2, the main substrate 1 is also installed a central processing device (i.e., CPU) 11 for applications, a microprocessor unit (i.e., MPU) 12 for CAN (registered trademark) communication, which is a type of in-vehicle LAN, a module 13 for Wi-Fi (registered trademark) communication. A switch I/F 14, an indicator I/F 15, a CAN_I/F 16, an airbag I/F 17, an ignition (i.e., IG) I/F 18 are connected to the MPU 12. The MPU 12 communicates with the NAD 3 and the CPU 11 within the main substrate 1. The NAD 3 may be provided with a cellular V2X (i.e., C-V2X) communication function in addition to the cellular wireless communication function.

A backup battery (i.e., BUB) 19 is connected to the main substrate 1 via a power supply connector 20. A power from a BUB 19 supplies backup power to each electronic component of the main substrate 1 and the sub substrate 2 via the BUB controller 21 and a power supply unit 22.

The Wi-Fi module 13 is connected to the antennas 231, 232 for the Wi-Fi communication, and the Wi-Fi module 13 communicates with the CPU 11 within the main substrate 1. Although not shown in FIG. 2, antennas 241, 242 for V2X communication are connected to the NAD 3 via the RF connectors 151, 152. In addition, antennas 251, 252 for cellular communication and an antenna 26 for GNSS (i.e., Global Navigation Satellite System) communication, which is communication for satellite positioning, are connected to the NAD 3.

Furthermore, an audio I/F 27 is connected to the NAD 3 via a codec 28, and an IMU (i.e., Inertial Measurement Unit) 29, an eSIM 30 that is a SIM (i.e., Subscriber Identity Module) card are also connected. The NAD 3 communicates with the CPU 11. The CPU 11 are connected to an Ethernet (registered trademark) interface 31 indicated as "ETH PHY" in FIG. 2, and memories such as a flash memory 32 and a DDR (i.e., Double Data Rate SDRAM) 33.

Figure 3:
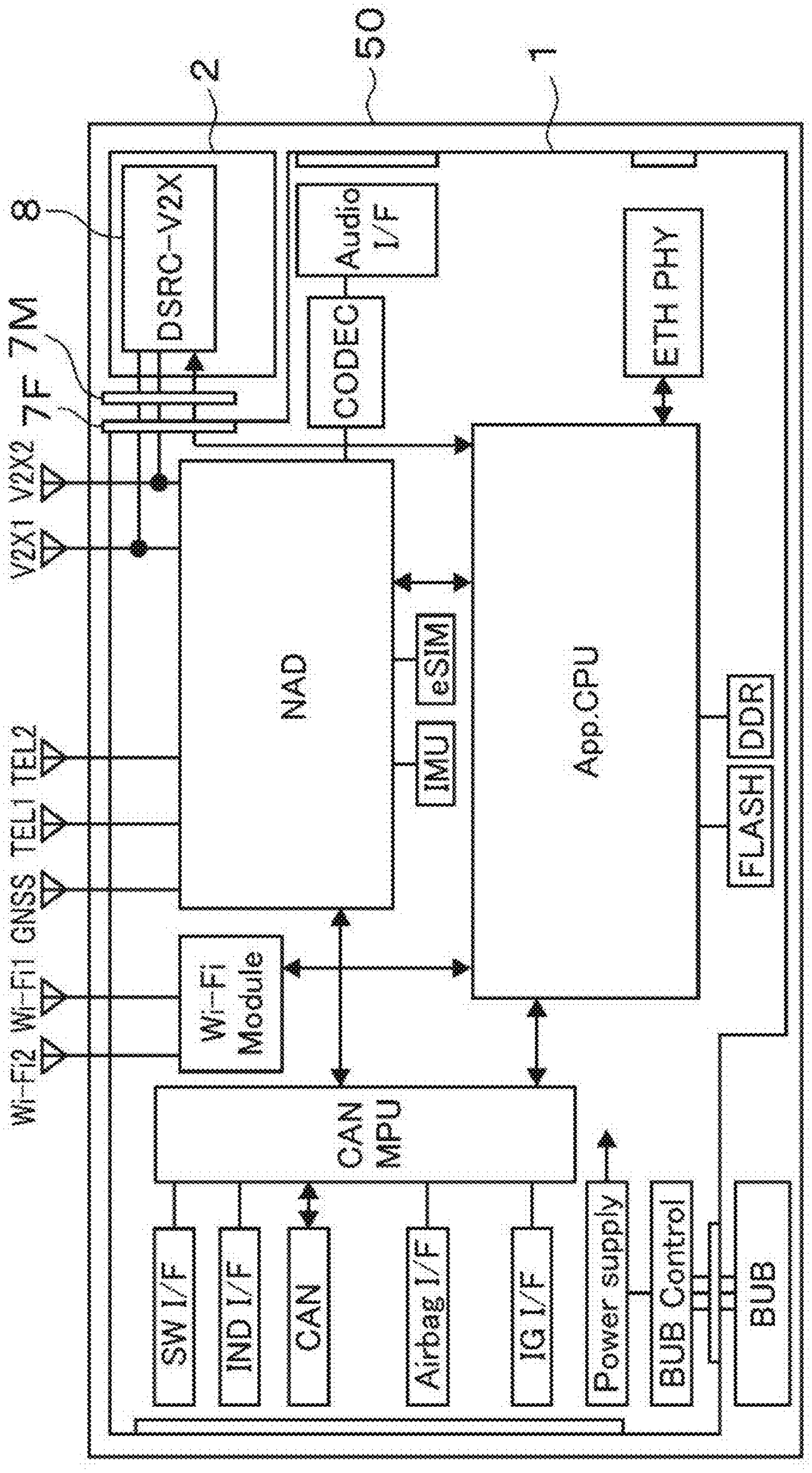
FIG. 3 is a functional block diagram illustrating the SCU when a sub substrate is connected to the main substrate.
Figure 4:
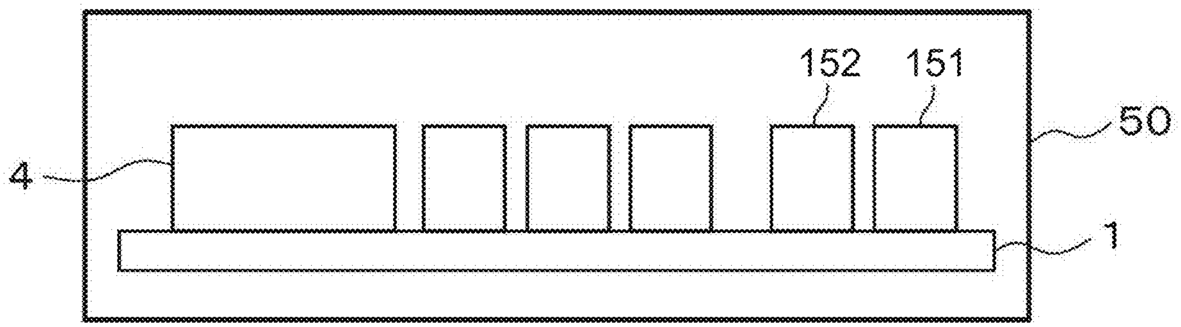
FIG. 4 is a front view schematically illustrating the SCU when only the main substrate is used.
Figure 5:
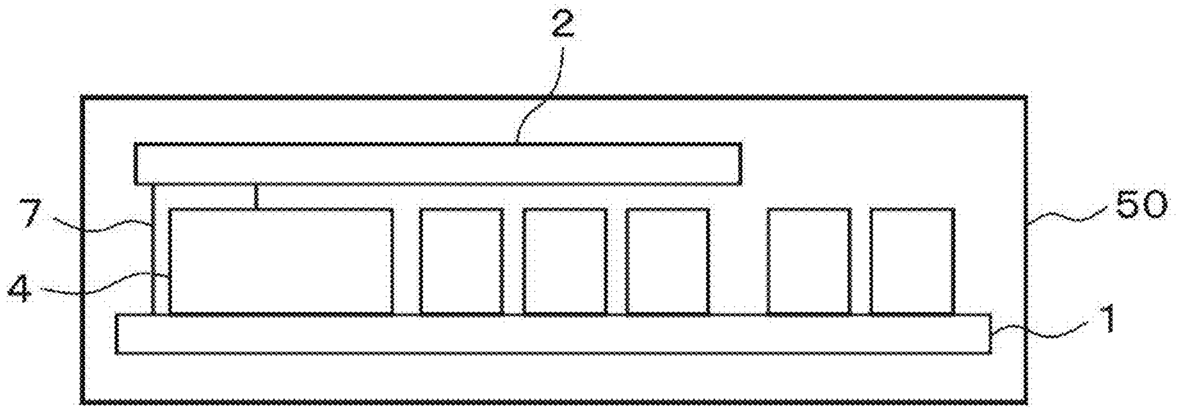
FIG. 5 is a front view schematically illustrating the SCU when the sub substrate is connected to the main substrate.

FIG. 3 shows a state in which the sub substrate 2 is connected to the main substrate 1. FIGS. 4, 5 are images corresponding to the states shown in FIGS. 2, 3, respectively. An area of the main substrate 1 is kept small by mounting the NAD 3 on the main substrate 1 and mounting the wireless module 8 for performing V2X communication on the sub substrate 2 as an option. The sub substrate 2 is connected to the main substrate 1 via the coaxial connector 7 when a function of performing V2X communication is required. At this time, the wireless module 8 of the sub substrate 2 is capable of performing the V2X communication using the antennas 241, 242 connected to the RF connectors 151, 152. Also, at this time, the wireless module 8 communicates with the CPU 11 via the coaxial connector 7.

As described above, according to the present embodiment, in the SCU 50, the sub substrate 2, which is equipped with an optional communication function, is vertically connected to the main substrate 1, which is equipped with at least a cellular communication function, via the coaxial connector 7. That is, the main substrate and the sub substrate are connected to each other in an overlapping state in an up-down direction. The main substrate 1 is equipped with the RF connectors 151, 152 for connecting antennas 241, 242 used for the wireless communication performed by the communication function of the NAD 3 and the sub substrate 2. The antennas 241, 242 are connected to the wireless module 8 of the sub substrate 2 via the coaxial connector 7 when the sub substrate 2 is connected to the main substrate 1.

With this configuration, there is no need to provide a connector for connecting an optional antenna for communication on the sub substrate 2, so the sub substrate 2 can be configured to be compact. The main substrate 1 and the sub substrate 2 overlap vertically when the sub substrate 2 is connected to the main substrate 1. Therefore, a thickness of the SCU 50, which is the connected structure, can be reduced.

Further, in the present embodiment, the optional communication function is, for example, the V2X communication function. The V2X communication is central to a development of connected car technology and next-generation mobility, and is a communication technology that collectively refers to connections and mutual cooperation between vehicles, pedestrians, infrastructure, etc. However, at present, an installation rate of the V2X communication in vehicles is low, and specifications vary from country to country. Therefore, if it is assumed that only the main substrate 1 will be compatible with the V2X communication, there will be many variations, which will increase the number of development steps and complicate production management, leading to an overall increase in costs. Therefore, by making the V2X communication available as an option, the option supports future versatility and expandability.

Second Embodiment

Hereinafter, the same parts as those in the first embodiment are assigned the same reference numerals, and explanations thereof are omitted. Differences from the first embodiment will be described. In an SCU 51 of a second embodiment, a function of an NAD 53 mounted on a main substrate 52 is slightly different from that of the NAD 3. The NAD 53 has a built-in C-V2X communication function and the GNSS function, which is a global positioning satellite system, and these functions are executed alternatively.

Figure 6:
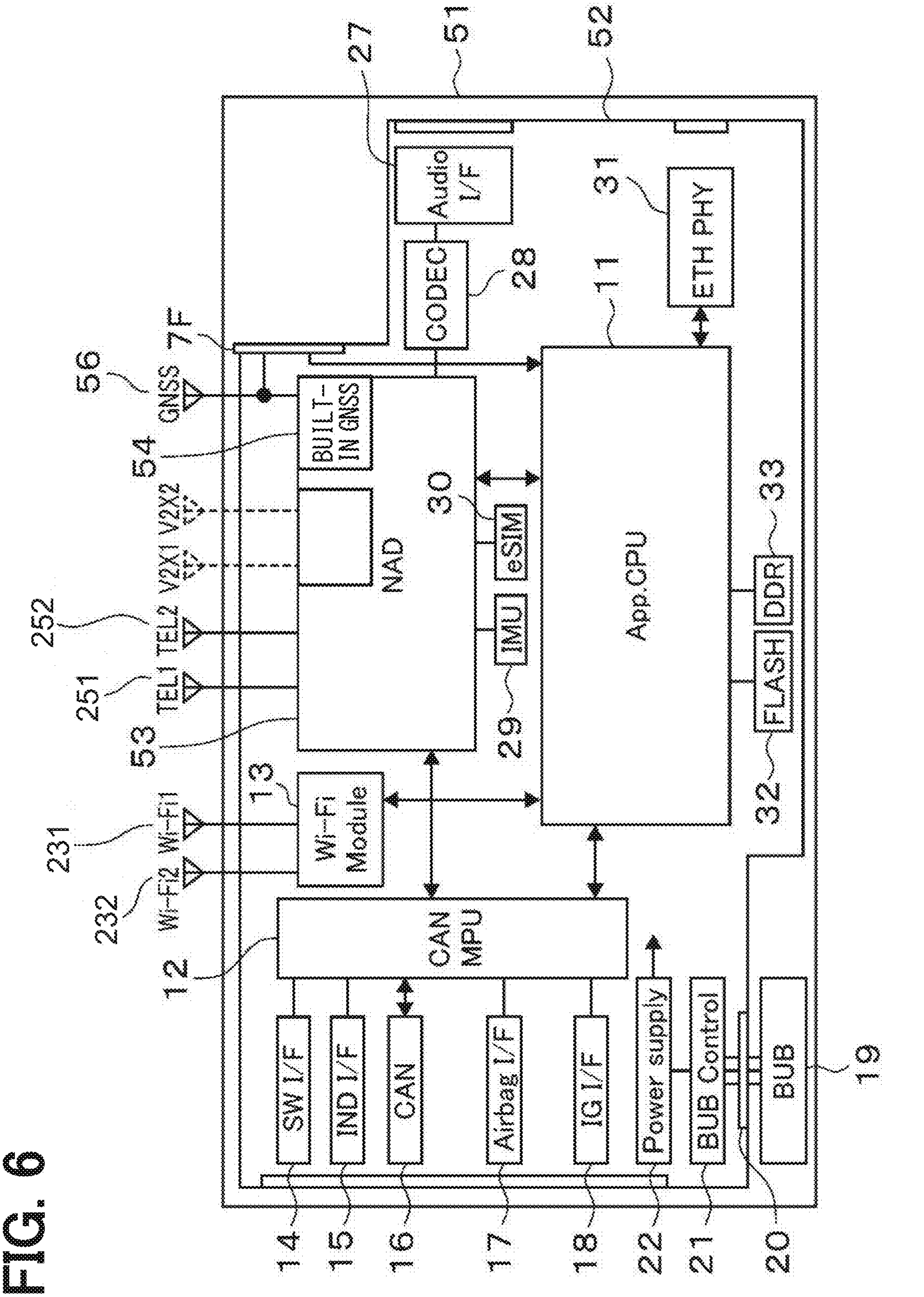
FIG. 6 is a functional block diagram illustrating an SCU when only a main substrate is used in a second embodiment.
Figure 7:
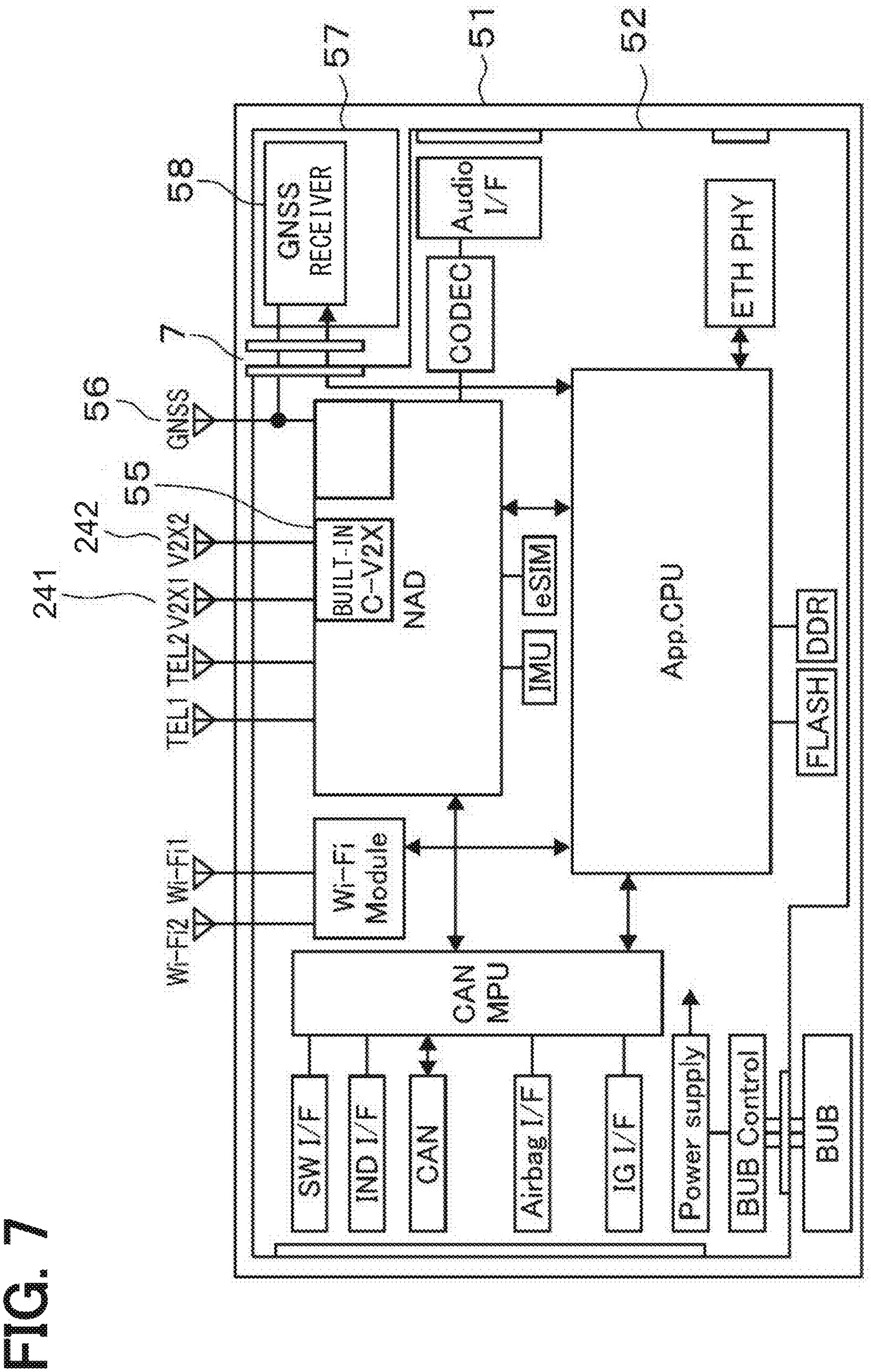
FIG. 7 is a functional block diagram illustrating the SCU when a sub substrate is connected to a main substrate.

In FIG. 6, a GNSS function unit 54 is clearly shown in the NAD 53, and in FIG. 7, a C-V2X communication function unit 55 is clearly shown. An antenna 56 for the GNSS communication is connected to the GNSS function unit 54. As shown in FIG. 6, the GNSS function unit 54 of the NAD 53 is enabled when only the main substrate 52 is used. When the C-V2X communication is not performed, accuracy required for the GNSS is relatively low, for example, on several tens of meters, so the GNSS function unit 54 uses one with a correspondingly low accuracy.

Figure 8:
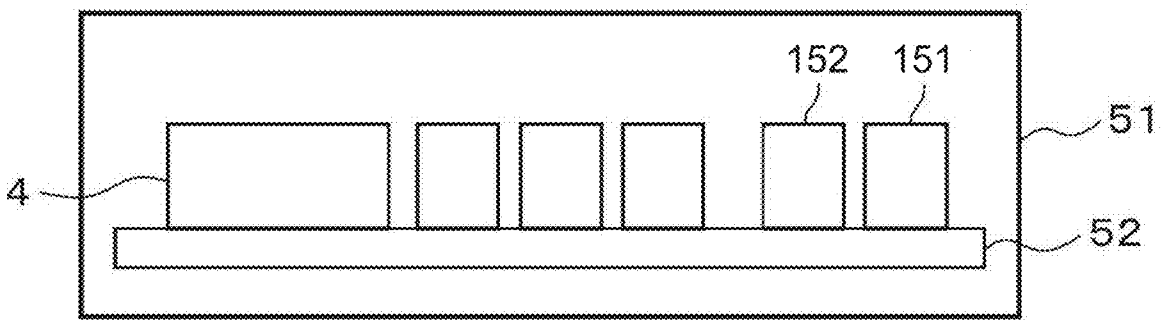
FIG. 8 is a front view schematically illustrating the SCU when only the main substrate is used.
Figure 9:
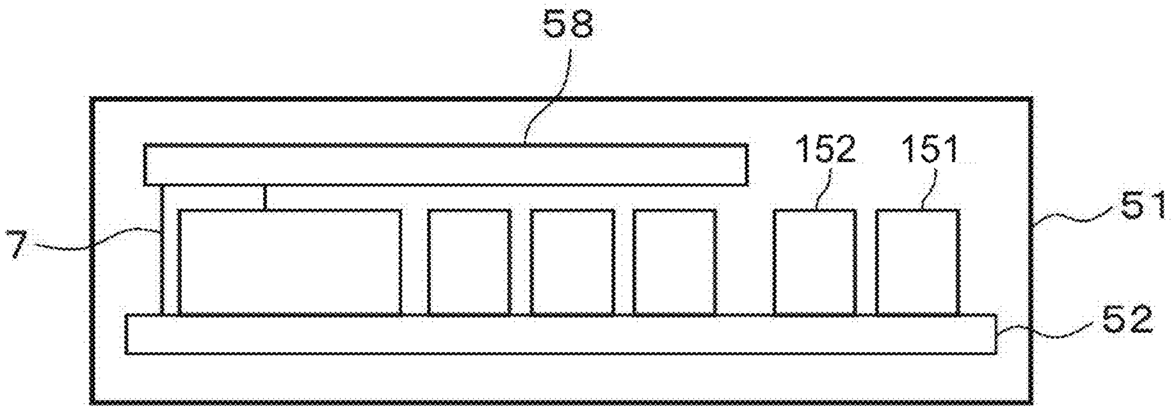
FIG. 9 is a front view schematically illustrating the SCU when the sub substrate is connected to the main substrate.

On the other hand, as shown in FIG. 7, a GNSS receiver 58 is mounted on a sub substrate 57. The C-V2X communication function unit 55 of the NAD 53 is enabled when the sub substrate 57 is connected to the main substrate 52 and used. When performing the C-V2X communication, the accuracy required for the GNSS is relatively high, for example, several meters, so the GNSS receiver 58 uses one with a correspondingly high accuracy. At this time, the antenna 56 is connected to the GNSS receiver 58 via the coaxial connector 7. FIGS. 8, 9 are images corresponding to the states shown in FIGS. 6, 7, respectively.

As shown in FIG. 6, the antennas 241, 242 is not necessary to connect with the main substrate 52 when the C-V2X communication function unit 55 is not used.

As described above, according to the second embodiment, the optional communication function mounted on the sub substrate 57 is the GNSS receiver 58, which has higher accuracy than the GNSS function unit 54 included in the NAD 53 of the main substrate 52. With this configuration, manufacturing cost of the main substrate 52 can be reduced, and when a more accurate communication function is required, the sub substrate 57 can be connected to the main substrate 52.

When the sub substrate 57 is connected to the main substrate 52, the NAD 53 disables the GNSS function unit 54 and uses the satellite positioning results obtained from the GNSS receiver 58 of the sub substrate 57 for communications performed by the C-V2X communication function unit 55. This allows the NAD 53 to utilize the satellite positioning results with the precision necessary for its own C-V2X communication.

OTHER EMBODIMENTS

The communication protocol to be used may be selected as appropriate depending on an individual design. The optional communication function is not limited to the V2X.

The peripheral circuits of the NAD mounted on the main substrate may also be selected as appropriate.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A substrate connection structure for a vehicle-mounted communication device, comprising:

a network access device having at least a wireless communication function;

a main substrate on which the network access device is mounted;

an antenna configured to be used for the wireless communication performed by the network access device; and an RF connector mounted on the main substrate and connected to the antenna; wherein the main substrate is configured to be connected to a sub substrate having an optional communication function via a coaxial connector in a vertically overlapping manner, the antenna is configured to be used for the optional communication function performed by the sub substrate, the antenna is connected to the optional communication function via the coaxial connector when the main substrate is connected to the sub substrate, the network access device has a communication function for satellite positioning, the optional communication function is a communication function for the satellite positioning with higher accuracy than the communication function for the satellite positioning of the network access device, the network access device is configured to disable the communication function for the satellite positioning of the network access device when the sub substrate is connected to the main substrate, and the network access device is configured to use satellite positioning information obtained from the communication function of the sub substrate.

* * * * *